United States Patent

Wang

(10) Patent No.: US 6,834,075 B2
(45) Date of Patent: Dec. 21, 2004

(54) METHOD FOR IMPROVING MULTIPATH SEARCHER SPEED

(75) Inventor: Michael Mao Wang, Carpentersville, IL (US)

(73) Assignee: Motorola, Inc., Schaumburg, IL (US)

( * ) Notice: Subject to any disclaimer, the term of this patent is extended or adjusted under 35 U.S.C. 154(b) by 800 days.

(21) Appl. No.: 09/760,413

(22) Filed: Jan. 12, 2001

(65) Prior Publication Data

US 2002/0094017 A1 Jul. 18, 2002

(51) Int. Cl.[7] ............................................. H04B 1/707
(52) U.S. Cl. ...................................... 375/143; 375/343
(58) Field of Search ........................... 375/130, 140–144, 375/146–148, 150, 152, 316, 340, 343

(56) References Cited

U.S. PATENT DOCUMENTS 5,710,768 A * 1/1998 Ziv et al. .................... 370/342
6,125,137 A * 9/2000 Wang et al. ................. 375/148

* cited by examiner

*Primary Examiner*—Kevin Burd
(74) *Attorney, Agent, or Firm*—Jeffrey K. Jacobs

(57) ABSTRACT

A multipath signal searcher (204) used in CDMA wireless communication systems is provided. Search paths (214) of the multipath signal searcher are grouped together and assigned by an offset assignment/timing block (210) to search a time offset within a search window. The search paths may be operated In serial or parallel operation mode. In either mode, the search paths are individually assigned to search over one of a group of time offsets that are distributed across the search window evenly. In parallel mode, the search paths are not only grouped to search only a given set of time offsets within the search window, but different groups of search paths are offset to commence searching at different times then other groups of search paths to more quickly update a finger manager and more quickly retrieve the mobile communication signal.

6 Claims, 3 Drawing Sheets

*-PRIOR ART-*

*-PRIOR ART-*

METHOD FOR IMPROVING MULTIPATH SEARCHER SPEED

BACKGROUND OF THE INVENTION

1. Field of the Invention

The present invention relates to a multipath signal searcher operating in a wireless communication system for obtaining a mobile communication signal and, more particularly, to a method of performing a mobile communication signal search over a search window of time offsets.

2. Descriptions of the Related Art

In wireless communication systems, a mobile communication signal transmitted between a mobile station (MS), such as a mobile telephone or a cellular telephone, to a base transceiver station (BTS) may be reflected off numerous scattering means, such as buildings, before reaching the BTS. As a result of these reflections, the mobile communication signal from the MS may propagate over multiple paths before reaching the BTS, for example. These reflected signals, typically referred to as multipath replicas, represent replicas of the original mobile communication signal and arrive at the BTS with variations in signal power levels, and at varying times, due to varying signal propagation lengths. Upon receipt by the BTS, the originally transmitted communication signal and the multipath replicas are filtered, despread, recombined and decoded to yield the desired voice or data signal originally sent by the MS. The same communication process described above between the MS and the BTS (reverse link) also occurs between the BTS and the MS (forward link).

One type of a wireless communication system is a direct sequence code division multiple access (DS-CDMA) cellular communication system such as set forth in the Telecommunication Industry Association Interim Standards 95 and 2000, hereinafter referred to as IS-95 and IS-2000, respectively. The mobile coded communication signals transmitted to and from the mobile station within the IS-95 or IS-2000 standards comprise spread spectrum signals which are transmitted in a common 1.25 MHz bandwidth channel, where each 1.25 MHz bandwidth channel is commonly referred to as a narrowband DS-CDMA channel. An exemplary narrowband code division multiple access (CDMA) communication system that may be used with the IS-95 standard is described in U.S. Pat. No. 6,108,324 to Brown et al. entitled APPARATUS AND METHOD FOR PERFORMING A SIGNAL SEARCH IN A COHERENT WIRELESS COMMUNICATION SYSTEM, which is incorporated herein by reference. In addition, there are numerous international standards proposed which suggest a coherent wideband CDMA transmission signal configuration that can be used to transmit other data in addition to the voice and low rate data of narrowband CDMA systems. An exemplary wideband CDMA communication system that may be used with the IS-2000 standard is described in U.S. Pat. No. 6,125,137 to Wang et al. entitled APPARATUS AND METHOD FOR PERFORMING A SIGNAL SEARCH IN A WIRELESS COMMUNICATION SYSTEM, which is incorporated herein by reference.

To search for the mobile communication signal, a multipath signal searcher is employed within the BTS or the MS, along with a RAKE receiver in communication with the multipath signal searcher. The mobile communication signal is searched over a search window having a plurality of time offsets. The multipath signal searcher includes numerous search paths, each separately searching for the mobile communication signal at a particular time offset within the search window. The time offsets correspond to pn-offsets in CDMA systems, and the resolution of these time offsets is typically one half of the PN chip duration (Tc). In typical systems, the search paths within a multipath signal searcher function in either serial or parallel modes.

In serial operation, the multipath signal searcher searches through the first half of the search window for the mobile communication signal by having all the search paths within the multipath signal searcher search only those time offsets over the first half of the search window. The first half is searched in one search time slot and the remaining portion of the search window, or second half of the search window, is searched in the next search time slot. For example, a search window may span 40:s corresponding to 50 time offsets for a PN chip rate of $1.2288 \times 10^6$ chips/sec where there are two time offsets per PN chip. The multipath signal searcher in serial operation would search the first 25 time offsets, i.e., offsets 0–24, in one time slot and the second 25 time offsets in the next time slot, i.e., offsets 25–49. As a result, the finger manager which oversees the filtering, despreading, recombining and decoding of the multipath signal uses the search results from the multipath signal searcher to update the finger status at a rate of once every two time slots.

FIG. 1 is a plot of an integration period used in a conventional mobile communication signal serial search. The time it takes for the multipath signal searcher to search is shown. The first half of the 50 time offsets are searched in the first search time slot, i.e., integration period 10 of four power control groups (PCGs) in length, in the example provided. In the IS-95 reverse link standard, the integration period 10 can represent the entire non-coherent accumulation of a search metric over the integration period 10. In the IS-2000 standard, the integration period 10 can represent, for example, that a search metric may be coherently accumulated within four different PCGs 12, 14 ,16 ,18 and non-coherently accumulated over the entire integration period 10. It takes a second integration period 20 to search the remaining time offsets, where the search path performs identically as over the first integration period 10, i.e., in the IS-2000 standard, the search metric may be coherently accumulated over four different PCGs 22, 24, 26, 28 and then non-coherently accumulated over the integration period 20. Therefore, in conventional serial operation, when searching the signal received from one antenna it takes the multipath signal searcher a total of eight PCGs, or two integration periods (10 and 20) to search the entire search window and thereafter be ready to update the fingers.

With parallel operation, the searcher is able to search the entire window in one search time slot; the fingers can then be updated every time slot. As shown in FIG. 2, the complete 50 time offset search window is searched in one integration period 30 and the finger manager, and therefore the finger demodulators in communication therewith, may be updated every four PCGs 32, 34, 36, 38. Since a multipath replica signal undetected by the finger demodulator may not only be ineffectual in improving demodulation quality, but potentially acts as interference to the receiver, a fast searcher will help improve receiver performance in a dynamic communication environment. It is therefore desirable to improve the searcher speed and thus the finger update rate to improve wireless communication receiver performance.

DETAILED DESCRIPTION OF THE PREFERRED EMBODIMENTS

Multipath signal searchers are used in RAKE receivers of CDMA wireless communication systems to search for a communication signal from a mobile station (MS) or a base (BTS) station. RAKE receivers may be employed in the MS for receiving signals from the BTS and in the BTS for receiving signals from the MS. The mobile communication signal may arrive at the BTS or the MS from multiple paths, because of reflections of the signal off various scattering surfaces. Provided is a method for improving the search speed of multipath signal searchers by assigning, for example, even and odd time offsets to search paths within a multipath signal searcher so as to increase the speed with which a mobile communication signal is found by the multipath signal searcher. The present invention is described below in the preferred embodiment of a CDMA wireless communication system, but persons of ordinary skill in the art will recognize that the teachings provided herein and claimed may be used in various other applications all within the scope of the present invention. Furthermore, with respect to CDMA wireless communication systems, the teachings provided herein maybe used in IS-95, IS-2000, or other similar CDMA standards, and with direct spread or multi-carrier systems.

Figure 3:
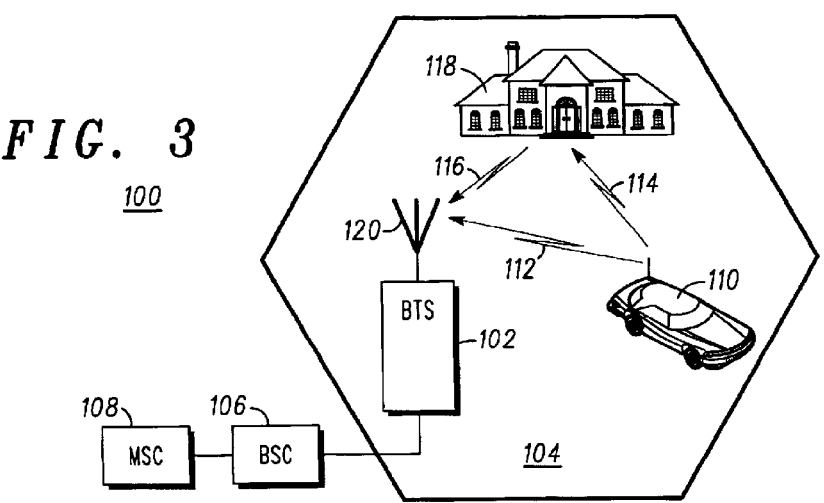
FIG. 3 is a block diagram of a cellular communications system in which the preferred embodiment of the present invention can be implemented.

By way of example not limitation, an exemplary environment of use for the present invention is a communication system 100 as shown in FIG. 3. Communication system 100 includes a base transceiver station (BTS) 102 with an associated coverage area 104 that is suitably coupled to a base station controller (BSC) 106. As will be appreciated by persons of ordinary skill in the art the BSC 106 may be coupled to other BTS's and other BSC's (not shown). The BSC 106 is shown coupled to a mobile switching center (MSC) 108. In the preferred embodiment the BTS 102, MSC 108, and BSC 106 are components available from Motorola, Inc. of Schaumburg, Ill. A MS 110, such as a cellular telephone or a mobile car telephone, operating in the coverage area 104 transmits a mobile communication signal to the BTS 102.

A RAKE receiver 119 (FIG. 4) within the BTS 102 provides tracking capability of an incoming multipath replica 116 and a mobile communication signal 112 from the MS 110. Similarly, MS 110 includes a transceiver (not shown) that transmits coded communication signals to and receives coded communication signals from the BTS 106.

The communication system 100 can be one employing a non-coherent or a coherent CDMA systems. In the latter system, for example, the coded communication signals transmitted from the MS 110, i.e., signals 112 and 114, comprise a pilot signal and a data signal. The pilot signal, enabling the use of coherent demodulation techniques, is comprised of a bit stream represented by +1's, while the data signal representative of voice, video, or data, is comprised of a bit stream represented by +1's and −1's. In the former non-coherent system, there would be no pilot signal, only the data signal.

As will be appreciated by persons of ordinary skill in the art, within CDMA technology, signals from the MS 110 include a pseudo-random short code associated therewith, assigned by the BTS 106, and a mobile unique pseudo-random long code mask. The inclusion of these codes results in a mobile unique pseudo-random noise sequence (PN sequence) for the MS 110, which is identifiable by the RAKE receiver 119 in the BTS 106.

Signals 114 and 116 are multipath replicas of the mobile communication signal 112, due, for example, to reflections of the communication signal from the MS 110 off of scattering surfaces, such as a building 118. The exemplary multipath replica 116 arrives at the BTS 106 at different times, offset from a reference time, commonly referred to as a pn-offset. The different time offsets are the result of varying propagation distances of the signal from the MS 110 to the BTS 106. That is, the mobile communication signal 112 arrives at antenna 120 offset in time from the reflected multipath replica signal 116.

Figure 4:
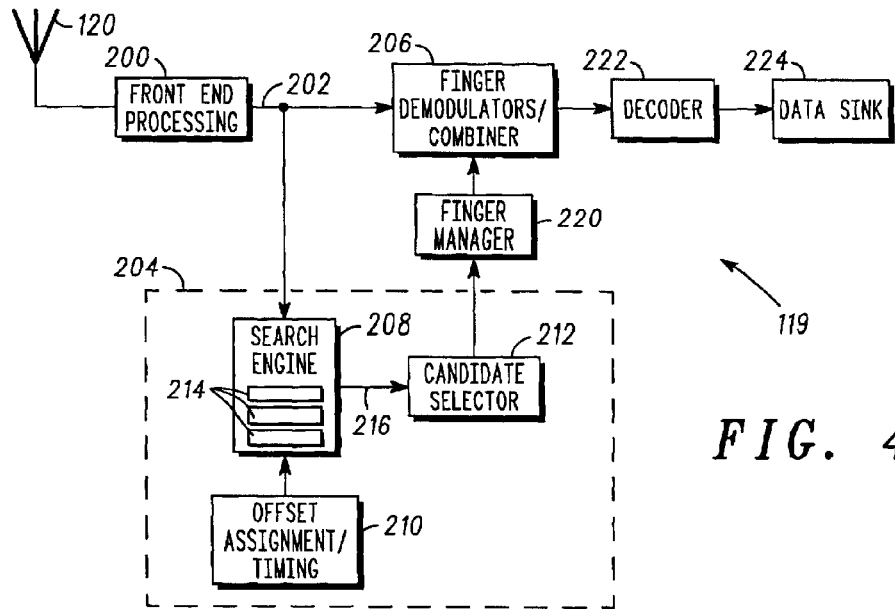
FIG. 4 is a detailed block diagram of the BTS of FIG. 3 including a multipath signal searcher in accordance with an embodiment of the present invention.

FIG. 4 shows an exemplary block diagram of the RAKE receiver 119 within the BTS 106 that searches the signal received by the antenna 120, where the signal received comprises the mobile communication signal 112 as well as any time offset multipath replicas 116. The signal received from the antenna 120 is transmitted to a front-end processing block 200, and a signal output 202 is sent to a multipath signal searcher block 204 and to a finger demodulator/combiner block 206. While the RAKE receiver 119 employing the method of the preferred embodiment is described within the BTS 106, persons of ordinary skill in the art will recognize that the RAKE receiver 119 may be within the MS 110 for detecting a mobile communication signal from the BTS 106.

The multipath signal searcher block 204 can be implemented by known means and searches the signal 202 for the mobile communication signal 112. The multipath signal searcher block 204 primarily functions to search for signals at various time offsets by measuring a search metric, such as energy, of the received signal. From this measurement, the multipath signal searcher block 204 creates or updates a listing of those time offsets which have a search metric above a certain threshold level, thereby identifying those time offsets which potentially include the mobile communication signal 112.

The multipath signal searcher block 204 has a search engine block 208 in communication with an offset assignment/timing block 210 and a candidate selector block 212. The search engine block 208 comprises a number of search paths 214 operating in either serial or parallel operation. Only these such search paths are shown, though many search paths would exist in the search engine block 208. Each search path 214 is associated with a particular time offset and searches the signal 202 at the specified time offset for a search metric. Offset assignment/timing block 210 assigns the various time offsets to the various search paths 214 within the search engine block 208 in accordance with the preferred embodiment.

In operation, all of the search metrics computed by the search paths identified per time offset are collectively sent to the candidate selector block 212 as search metrics 216. The candidate selector block 212 compares the search metrics 216 and determines which ones have the signals above a threshold value, thereby producing a best set of time offsets 218 having search metrics above this threshold value. The best set of time offsets 218 are provided to a finger manager block 220 which controls a plurality of finger demodulators in the finger demodulator/combiner block 206, where each finger demodulates the signal 202 at a particular time offset assigned by the finger manager 220. The demodulated signals are combined within the finger demodulator/combiner block 206 and the combined signal is typically sent to a deinterleaver (not shown) before being sent to a decoder 222 and subsequent data sink 224, as is conventionally known.

The offset assignment/timing block 210 assigns time offsets to the search paths 214 in the search engine block 208 to more quickly find the mobile communication signal 112, and the search paths 214 within the search engine block 208 may be operated in serial or parallel operation.

Figure 1:
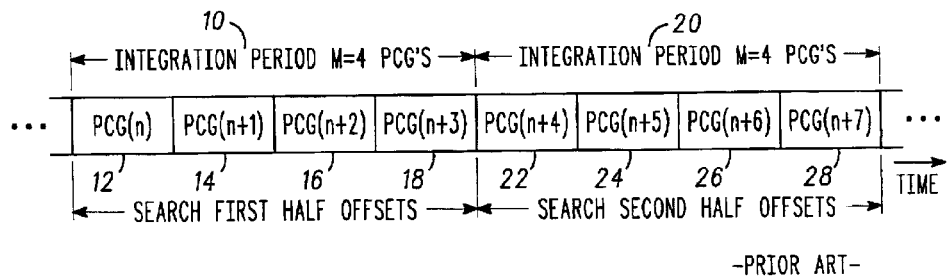
FIG. 1 is a plot of a prior art search for a mobile communication system using a multipath signal searcher with search paths in a serial operation mode.
Figure 2:
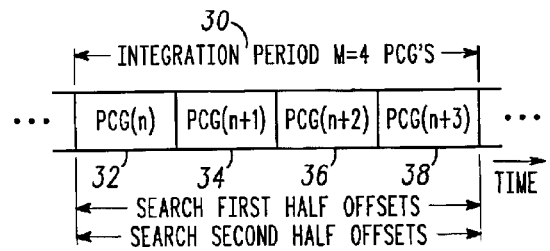
FIG. 2 is a plot of a prior art search for a mobile communication system using a multipath signal searcher with search paths in a parallel operation mode.

In serial operation, conventional searchers search the entire search window of time offsets taking two time slots to complete such a search. The conventional multipath signal searcher searches the first half time offsets in the first search time slot and the second half time offsets in the second time slot, as is shown in FIG. 1 explained above. In one embodiment herein disclosed, the offset assignment/timing block 210, in the serial operation mode, assigns all even time offsets within the search window, i.e., 0, 2, 4 . . . 48, to the search paths 214 in the first search time slot and all the odd time offsets, i.e., 1, 3, 5, . . . , 49, to the search paths 214 in the second time slot. 25 search paths 214 are required to have a search path for each time offset to be assigned by the offset assignment/timing block 210, assuming a 50 time offset search window. In this way, the entire search window may be searched across within each time slot, not just a portion of the entire search window. By having all even time offsets searched in the first time slot, time offsets at the front edge of the search window, time offsets at the back edge of the search window, and periodic time offsets therebetween can all be searched in a single time slot. In this way, the search paths 214 search across the entire search window in one time slot, and search evenly across the entire search window as the time slots are distributed across the search window such that there is equal likelihood of detecting a signal at any time offset within the search window.

Figure 5:
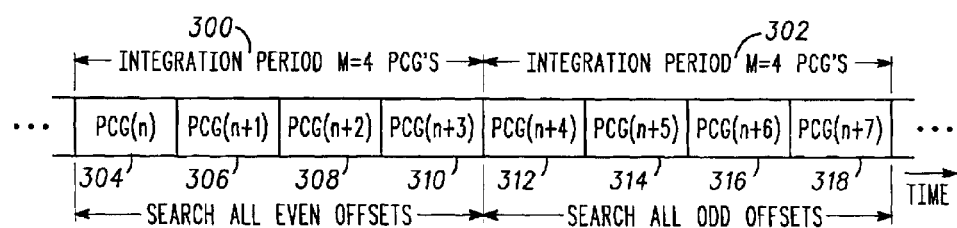
FIG. 5 is a plot of the timing for a mobile communication search using a multipath signal searcher with search paths in a serial operation mode in accordance with an embodiment of the present invention.

As show in FIG. 5, the search paths 214 search 25 even time offsets during a first integration period 300 and search 25 odd time offsets during a second integration period 302. By way of example, not limitation, each integration period is shown to be four PCGs in length. The plot of FIG. 5 may depict non-coherent accumulation of the search metric or coherent/non-coherent accumulation of the search metric. In a non-coherent CDMA system, the search metric would be non-coherently accumulated by the search paths 214 over the integration period 300 in the first time slot, and non-coherently accumulated by the search paths 214 over the integration period 302 in the second time slot. In a coherent CDMA system, on the other hand, the search metric may be coherently accumulated over four individual PCGs 304, 306, 308, 310 and then non-coherently accumulated over the entire integration period 300 in the first time slot. The search metric may also be coherently accumulated over four individual PCGs 312, 314, 316, 318 and then non-coherently accumulated over the integration period 302 in the second time slot.

In the preferred embodiment, the two integration periods 300 and 302 are identical. The example of FIG. 5 shows serial operation in which the search paths 214 search over even offsets in the first integration period and over odd offsets in the second integration period. It will be appreciated by persons of ordinary skill in the art that the order of these searches may be reversed.

In this way, whereas with a conventional serial searcher, to search across the entire search window takes two time slots, with the offset assignment/timing block 210 assigning offsets as described herein the entire search window is searched across within one time slot, i.e., every odd or even time offset is searched within a time slot. This allows an update to be sent to the candidate selector block 212 every time slot, instead of every two slots, thereby allowing the finger manager 220 to tune the finger demodulators to retrieve the mobile communication signal 112 from the signal received by the antenna 120 every time slot. Thus the BTS 106 operating within this serial method responds quicker to receive, demodulate, and decode a signal.

Figure 6:
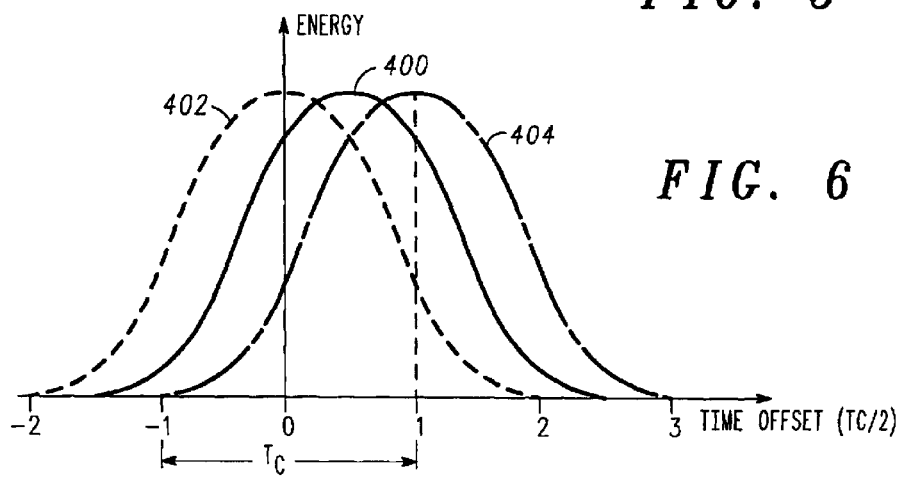
FIG. 6 is a plot of signal strength versus time offset for three exemplary multipath signals to be searched for during a multipath signal search.

Though, the search paths 214 receiving time offset designations from the offset assignment/timing block 210 do not search every time offset of the search window within one time slot or integration period, the multipath signal searcher 204 is still likely to detect the incoming mobile communication signal 112 and the multipath replicas 116 because the signal is likely to be either at or near the searched time offset. For example, if a multipath signal 402 coincides with search time offset "0" then the search path 214 assigned time offset "0" will find the signal 402 during its initial, even time offset search. As shown in FIG. 6, if the multipath signal is signal 400 which is centered between the "0" time offset and the "1" time offset, the search path 214 searching the "0" time exists is still likely to detect the signal 400, as it has a measurable amplitude at time offset "0". In the extreme case, if the multipath signal happens to be at an odd time offset (signal 404) such as time offset "1", the searcher is still likely to detect some of the energy from the signal at offsets "0" and/or "2" if the signal is strong enough, because a portion of that signal has a detectable energy at time offset "0". The spacing between the even and odd time offsets in FIG. 6 is Tc/2. For example, a search window may span 40:s corresponding to 50 time offsets for a PN chip rate of $1.2288 \times 10^6$ chips/sec where there are two time offsets per PN chip and 0.4:s (0.8:s/2) between time offsets. The spacing between time offsets, which is equal in the preferred embodiment, may be adjusted in length to give the system better resolution and increase the likelihood of measuring the multipath signals 400 and 404. In either of the two scenarios in which the multipath signal is not centered on a time offset being searched, i.e., signal 400 or 404, a known delay locked loop within the RAKE 119 (not shown) will further fine tune the finger demodulators to the peak position of the multipath signal. Therefore, for strong multipath signals, such as 400, 402, 404, the detection time is reduced by half as compared to the conventional search method.

In conventional parallel operation systems, multipath signal searchers search all time offsets within the search window (e.g., 50 search paths for a 50 time offset search window) in a single time slot. The search results are forwarded to a finger manager at the end of the time slot, i.e., the integration period 30. The finger demodulators are, thus, updated every time slot.

Figure 7:
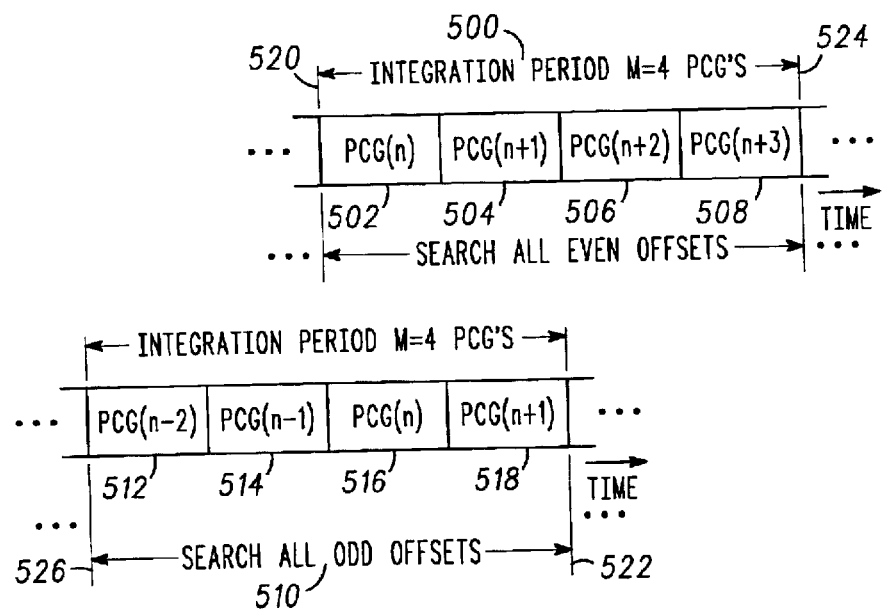
FIG. 7 is a plot of the timing for a mobile communication search using a multipath signal searcher with search paths in a parallel operation mode in accordance with an embodiment of the present invention.

In an embodiment of the multipath signal searcher 204 operating in parallel operation mode, time offsets are grouped into even and odd time offsets, such that half of the search paths 214 are used to search even time offsets and the other half of the search path 214 are simultaneously used to search odd time offsets. Time offset assignment is achieved through the offset assignment/timing block 210. Unlike the conventional parallel searcher, the timing of the even time offset searching and the odd time offset searching is offset by one half of the search time slot. A plot is shown in FIG. 7.

All search paths 214 assigned to search even time offsets start searching at the beginning of a first integration period 500. By way of example and not limitation and using known means such as the search paths described in U.S. Pat. No. 6,125,137 incorporated herein by reference, the search paths 214 in a wideband CDMA system may coherently accumulate the search metric over four separate PCGs 502, 504, 506, 508 and non-coherently accumulate the search metric over the entire integration period 500. The search paths 214 assigned to search odd time offsets would coherently accumulate over four PCGs 512, 514, 516, 518 and non-coherently over an integration period 510 as identified. The offset assignment/timing block 210 of FIG. 4 separates the timing of the search paths 214 such that those search paths 214 assigned to search even time offsets start searching, in a preferred embodiment, one half integration period after the start of the odd time offset integration period 510, i.e., even time offset searching starts at time 520 and odd time offset searching states at time 526.

In this way, the parallel operation mode allows the search paths 214 to update the candidate selector 212 every one half integration period instead of every integration period 30 as in conventional parallel operation, thereby making the preferred embodiment twice as fast as the conventional system. While the even time offset search paths 214 search, specifically at time 522, the odd time offset search paths 214 have completed searching for the multipath signals within signal 202 and send an update to the candidate selector 212. Thus, the finger demodulator 206 is updated every half integration period at time 522 or 524 when either the odd time offset search paths 214 or the even time offset search paths 214, respectively, complete searching for the mobile communication signal 112.

In either the serial or parallel operation modes, the search paths 214 of the multipath signal searcher 204 can be implemented using numerous known designs. As stated above, in the preferred embodiment the present teachings are implemented in a wideband CDMA system which can be employed using the search paths such as those described in U.S. Pat. No. 6,125,137, incorporated herein by reference. The search paths shown therein include a PN despreader, a pilot walsh despreader and an energy accumulator capable of coherent and non-coherent signal accumulation, as would be known to persons of ordinary skill in the art. The search paths 214, nevertheless, could have other forms such as those shown in U.S. Pat. No. 6,108,324 (incorporated by reference), which provides a search path with an offset quadrature phase shift keying OQPSK despreader, a Fast Hadamard Transform (FHT) block, a magnitude squarer, a winning Walsh symbol block, and an accumulator, as would be known to persons of ordinary skill in the art. In any event, the search paths 214 may be of numerous types of designs so long as they are assigned to search time offsets in accordance with the teachings detailed above.

Persons of ordinary skill in the art will recognize that the RAKE receiver 119 may be implemented in a BTS as described above for detecting a multipath signal from a MS or in a MS for detecting a multipath signal from a BTS. The disclosure and the claims are not meant to, nor should they be construed as, limited to one environment or the other. The multipath signal searcher 204 may be implemented using an application specific integrated circuit (ASIC) or other suitable means.

Many additional changes and modifications could be made to the invention without departing from the fair scope and spirit thereof. The scope of some changes is discussed above. The scope of others will be come apparent from the appended claims.

What I claim is:

1. A method for performing a mobile communication signal search using a multipath signal searcher, the multipath signal searcher including a number of search paths searching for the mobile communication signal in a search window defined by a plurality of time offsets, the method comprising the steps of:

identifying a first group of time offsets and a second group of time offsets, where said first group of time offsets and said second group of time offsets are distributed across said search window;

assigning each one of said first group of time offsets to one of a first group of said search paths;

assigning each one of said second group of time offsets to one of a second group of said search paths;

commencing at a first time, simultaneously searching each of said first group of search paths for said mobile communication signal over a first integration period;

commencing at a second time which is offset from said first time, simultaneously searching each of said second group of search paths for said mobile communication signal over a second integration period, wherein said first group of time offsets comprise only even time offsets and wherein said second group of time offsets comprise only odd time offsets.

2. The method of claim 1, wherein said first group of time offsets are distributed across said search window evenly, such that the spacing between time offsets in said first group of time offsets is identical and wherein said second group of time offsets are distributed across said search window evenly, such that the spacing between time offsets in said second group of time offsets is identical.

3. The method of claim 1, wherein the first integration period and the second integration period have equal duration in time.

4. The method of claim 3, wherein the offset between said first time and said second time is one half of said duration in time.

5. The method of claim 4, further comprising the steps of:

after said first integration period, sorting and ranking output signals from each search path of said first group of search paths to produce a best set of time offsets; and communicating said best set of time offsets to a finger manager for operating a plurality of finger demodulators to receive said mobile communication signal.

6. The method of claim 4, further comprising the steps of:

after second integration period, sorting and ranking output signals from each search path of said second group of search paths to produce a best set of time offsets; and communicating said best set of time offsets to a finger manager for operating a plurality of finger demodulators to receive said mobile communication signal.

* * * * *